May 8, 1928.

O. C. TRAVER 1,669,149

PROTECTIVE ARRANGEMENT

Filed May 4, 1926

Inventor:
Oliver C. Traver,
by
His Attorney.

Patented May 8, 1928.

1,669,149

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

PROTECTIVE ARRANGEMENT.

Application filed May 4, 1926. Serial No. 106,732.

My invention relates to improvements in protective arrangements for electric systems and more particularly to improvements in the protection of electric circuits such as the feeders of a system whereby on the occurrence of abnormal conditions to insure adequate protection and to maintain continuity of service on sound circuits under transient conditions such as power surges arising during the disconnection of faulty parts of the system.

My invention will be better understood from the following description taken in connection with the accompanying drawing and its scope will be pointed out in the appended claims.

Figure 1:
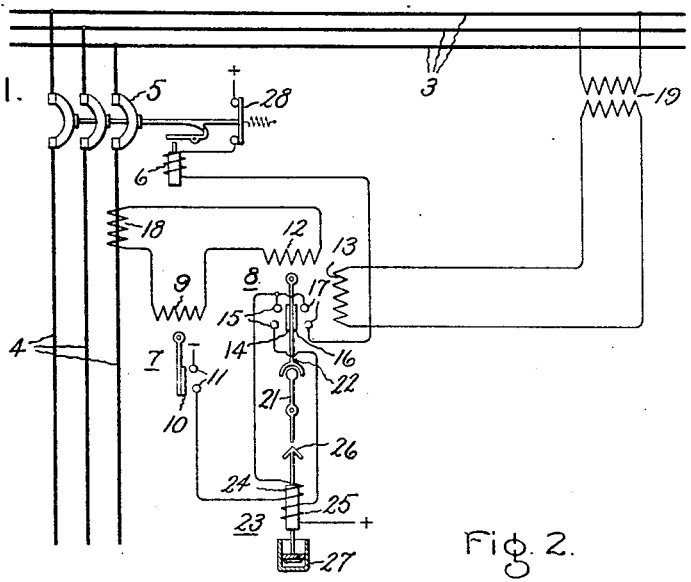
Figure 2:
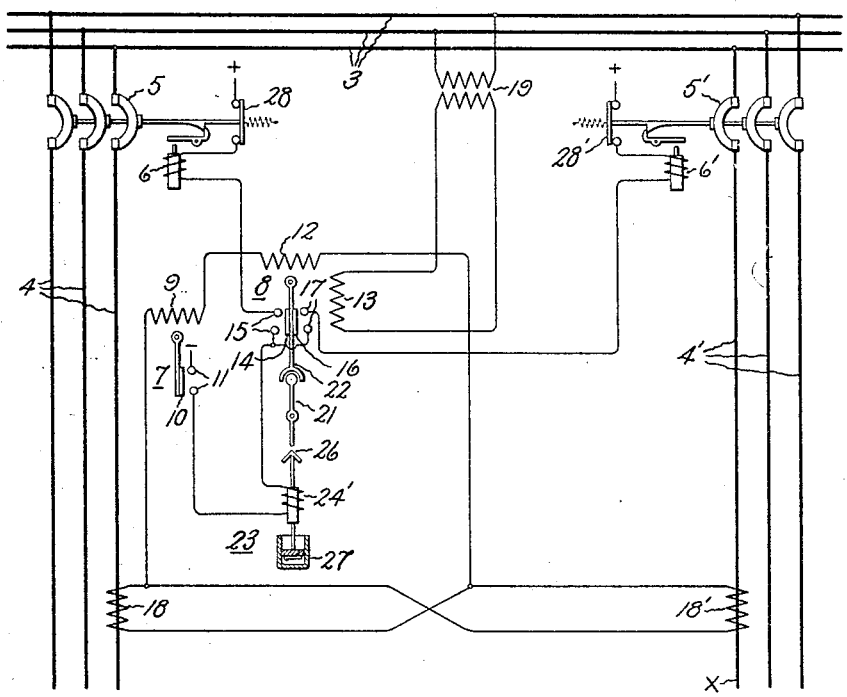

In the accompanying drawing, Fig. 1 illustrates diagrammatically a part of a three-phase electric system comprising a single feeder, one phase of which is shown protected in accordance with my invention, and Fig. 2, illustrates diagrammatically a part of a three-phase electric system comprising two parallel feeders, one phase of each of which is shown protected in accordance with my invention.

Fig. 1 shows a portion of a three-phase electric system comprising a bus 3 and an electric circuit such as a feeder 4 which is arranged to be connected thereto through suitable circuit interrupting means such as a circuit breaker 5 having a trip coil 6. For protecting the feeder 4 on the occurrence of abnormal conditions which tend to produce changes in the direction of power flow and excess currents, I provide electroresponsive overcurrent and directional means for controlling the circuit breaker 5. This means, as shown, comprises a single throw overcurrent relay 7 and a double throw directional relay 8. The overcurrent relay 7, which may be of the time limit type, comprises an energizing winding 9 and relatively movable cooperating contacts 10 and 11. The directional relay 8 comprises cooperating current and potential windings 12 and 13 respectively and operates in conformance with the direction of power on the feeder 4 in one or the other of two positions or directions to control two sets of relatively movable cooperating contacts 14, 15 and 16, 17 in a double throw arrangement. The current windings 9 and 12 of the relays 7 and 8 respectively are connected to be energized from the feeder 4 in accordance with the current in one of the phase conductors by any suitable means, such as a current transformer 18. The potential winding 13 of the relay 8 is connected to be energized in accordance with a potential of the circuit by any suitable means such as a potential transformer 19. Although the relays 7 and 8 are, for the sake of clearness, shown for only one phase, it will be obvious to those skilled in the art that these relays may be applied to all or part of the phases and that either single phase or polyphase directional relays may be used.

The relay 8 is connected and arranged so that with power in the feeder 4 in one direction, for example, outgoing or from the bus 3 to the feeder 4, the contacts 16, 17 will close and with power in the opposite direction the contacts 14, 15 will close. The contacts 10, 11 and 16, 17 are connected in series in the circuit of the trip coil 6. Consequently, with system conditions such that the current in the feeder 4 is sufficient to operate the relay 7 and the direction of power is outgoing, for example a fault on the feeder 4, the trip coil 6 will be energized and the circuit breaker 5 opened.

With system conditions such that the current in the feeder 4 is sufficient to operate the relay 7, and the direction of power is incoming or to the bus 3, for example a fault elsewhere than on the feeder 4, the directional relay 8 will operate to close its contacts 14, 15 instead of the contacts 16, 17, and the trip coil 6 will not be energized. The disconnection of the faulty part or parts of the system may, however, be followed by transients such as power surges, and a sudden reversal of power, that is outgoing, may occur before the overcurrent relay 7 has time to open its contacts. This would cause the closing of the directional relay contacts 16, 17 substantially instantaneously, and, since the overcurrent relay contacts may still be closed, the energization of the trip coil. This would open the circuit of the feeder 4 and interrupt service on a sound part of the system. Such interruption of service is undesirable.

In order to maintain continuity of service on the feeder 4 on the occurrence of such transient power surges as arise from faulty conditions on other parts of the system and accompany the disconnection of the faulty part or parts thereof, I provide, in accordance with my invention, means for preventing the opening of the circuit breaker 5 a predetermined time after the opening of the contacts of the overcurrent relay 7 when the direction of power flow is incoming. As shown in Fig. 1, this means may comprise a movable member 21 pivotally engaging the movable member 22 which carries the contacts 14, 16 of the relay 8, and locking means for restraining this member 21 so as to hold the movable member 22 in one contact controlling position or the other for a predetermined time after the opening of the overcurrent relay contacts. The locking means as shown comprises a substantially instantaneous pick-up time delay drop-out relay 23 which is arranged to be controlled jointly by the relays 7 and 8. The relay 23 may have one or more windings 24, 25 which are arranged to assist and whose circuits include, in series connection, the contacts 10, 11 and 14, 15, or 10, 11 and 16, 17.

Assuming current in the feeder 4 above a predetermined value and the direction of power outgoing then the overcurrent relay 7 closes its contacts and the directional relay 8 closes its contacts 16, 17, thereby energizing the winding 24 of the relay 23. The movable member 26 of the relay 23 will then move into a position to engage the movable member 21, the lower end of which is moved to the left of the position shown when the circuit controlling member 22 of the relay 8 closes contacts 16, 17. These contacts will, therefore, be maintained in the closed position as long as the overcurrent relay contacts 10, 11 are closed and for a predetermined time after they open. This time is dependent on the setting of suitable retarding means such as a dash pot device 27. Fluttering of the circuit controlling member 22 is thereby prevented so that a good contact in the trip coil circuit is insured and the breaking of the trip coil circuit will ensue at some other point, such as the circuit breaker auxiliary switch 28, thus saving the more delicate relay contacts.

If, however, system conditions are such that the overcurrent relay 7 closes its contacts and the directional relay 8 closes its contacts 14, 15, both of the windings 24 and 25 of the relay 23 will be energized. The movable member 26 will then be actuated by a greater force and will be moved into a position to engage the member 21, the lower end of which moves to the right of the position shown when the contacts 14, 15 close. Consequently, these contacts will be maintained in the closed position as long as the overcurrent relay contacts 10, 11 are closed and for a predetermined time after they open. Therefore, if in the process of eliminating the faulty condition which causes the relay 7 to operate and the relay 8 to close its contacts 14, 15, power surges occur, it will be impossible for the circuit of the trip coil to be completed and the circuit breaker 5 cannot be opened until a predetermined time after the opening of the relay contacts 10, 11. Continuity of service is therefore maintained on the sound feeder 4 even though system disturbances tend to cause the protective apparatus to function as it normally should on the occurrence of a fault on the feeder itself.

In the embodiment of my invention illustrated in Fig. 2, the electric system is shown as comprising, in addition to the feeder 4, a parallel feeder 4' which is arranged to be connected to the bus 3 through a circuit interrupter 5' having a trip coil 6'. In order, however, to control the circuit interrupters 5, 5' selectively in accordance with the line carrying the greater current, the current windings 9 and 12 of the overcurrent and directional relays 7 and 8 are connected to be energized in accordance with the difference between the currents in corresponding phase conductors of the feeders 4, 4'. For this purpose the relay windings 9 and 12 may be connected across normally equi-potential points of a circuit comprising the secondaries of the current transformers 18, 18' connected in series cumulative, that is for normally circulating current. The circuit controlling member 22 of the directional relay 8 consequently takes a position dependent on the direction of the difference current. If we assume, for example, outgoing power and that the feeder 4 is carrying the greater current, then the contacts 14, 15 will be closed, whereas when the feeder 4' is carrying the greater current, the contacts 16, 17 will be closed.

The contacts 10, 11 and 14, 15 are arranged in series in the circuit of the trip coil 6 while the contacts 10, 11 and 16, 17 are arranged in series in the circuit of the trip coil 6'. Each of the trip coil circuits includes in series relation between the contacts 10, 11 and 14, 15 or 16, 17, the energizing winding of the instantaneous pick-up time delay drop-out relay 23.

If we assume the normal direction of power on the feeders 4, 4' to be outgoing or from the bus 3 and a fault occurs for example at X on feeder 4', then a current proportional to the difference between the currents in the feeders appears in the current winding 12 of the relay 8 in a direction to cause the closing of the contacts 16, 17. This completes the circuit of the trip coil 6' and effects the opening of the circuit interrupter 5'. Upon the opening of this interrupter, the direction of the current in the winding 12 of the relay 8 is reversed and consequently the relay 8 tends quickly to reverse the position of its contact controlling member 22 and close the contacts 14, 15. If the overcurrent relay 7 has not opened its contacts 10, 11 as may happen particularly in case the circuit interrupter at the other end of the feeder 4' should open subsequently to the circuit interrupter 5', the circuit of the trip coil 6 will be completed, thereby interrupting continuity of service on the sound feeder.

In accordance with my invention, I prevent this undesirable feature in that, when the relay 8 closes its contacts 16, 17 its circuit controlling member 22 will be held in circuit closing position on these contacts for a predetermined time sufficient to allow the relay 7 to open its contacts if the fault at X is properly cleared. This is accomplished by the relay 23 which is energized when the contacts 10, 11 and 16, 17 are closed. The restraining member 26 is moved into a position to engage the lower end of the movable member 21, this lower end having moved to the left of the position shown. The circuit controlling member 22 is therefore restrained in circuit controlling position on the contacts 16, 17 for a predetermined time dependent on the setting of the time delay means 27. This restraint not only prevents fluttering of the contacts 16, 17 and opening of the trip coil circuit, thereby insuring certain tripping and saving the relay contacts since the trip coil circuit is interrupted by the auxiliary switch 28, but also prevents the closing of the contacts 14, 15 and the circuit of the trip coil 6 for a predetermined time. This gives the overcurrent relay 7 time to resume its normal position so that when the relay 23 releases the circuit controlling member 22, the circuit of the trip coil 6 will be open at the contacts 10, 11.

The feeder 4, now being the only one in service, is protected in case of a fault causing overcurrent and outgoing power and lasting for the time setting of the overcurrent relay 7. In this case the circuit interrupter 5 will be tripped, since contacts 10, 11 and 14, 15 will be closed.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is,—

1. An electric circuit and means for opening the circuit on the occurrence of power flow in one direction and current above a predetermined value comprising a circuit interrupter and electroresponsive means for controlling the opening thereof comprising an overcurrent relay and a directional relay connected to be energized from the circuit, and means comprising a substantially instantaneous pick-up and time delay drop-out relay controlled jointly by the overcurrent and the directional relays and arranged when the overcurrent relay is actuated and power flow is in the opposite direction to prevent the opening of the circuit interrupter for a predetermined time upon a sudden reversal of power to the first direction.

2. An electric circuit, and means for opening the circuit on the occurrence of power flow in one direction and current above a predetermined value comprising a circuit interrupter, and electroresponsive means for controlling the opening thereof comprising an overcurrent relay and a power directional relay connected to be energized from the circuit, and means controlled jointly by the relays and arranged when the overcurrent relay is actuated and power flow is in the opposite direction to prevent the opening of the circuit interrupter for a predetermined time upon a sudden reversal of power to the first direction.

3. In an electric system comprising a circuit interrupter, controlling means therefor comprising an overcurrent relay and a directional relay arranged to open the circuit interrupter when the overcurrent relay is actuated and the directional relay is in one position, and to permit the circuit interrupter to remain closed when the overcurrent relay is actuated and the directional relay is in another position, and means controlled jointly by the relays for holding the directional relay for a predetermined time in one of said positions when the overcurrent relay is actuated.

4. In an electric system comprising a circuit interrupter, controlling means therefor comprising an overcurrent relay and a directional relay arranged to open the circuit interrupter when the overcurrent relay is actuated and the directional relay is in one position and to permit the circuit interrupter to remain closed when the overcurrent relay is actuated and the directional relay is in another position, and means controlled jointly by the relays for holding the directional relay for a predetermined time in the other position when the overcurrent relay is actuated.

5. An electric circuit and means for opening the circuit comprising an overcurrent relay and a double throw directional relay arranged to open the circuit interrupter when the overcurrent relay is actuated and the directional relay is in one position and to permit the circuit interrupter to remain closed when the overcurrent relay is actuated and the directional relay is in another position, and means controlled jointly by the relays for holding the directional relay for a predetermined time in either position when the overcurrent relay is actuated.

6. In an electric system comprising a circuit interrupter, controlling means therefor comprising a single throw relay and a double throw relay arranged to open the circuit interrupter when the single throw relay is actuated and the double throw relay is in one position and to permit the circuit interrupter to remain closed when the single throw relay is actuated and the double throw relay is in another position, and means controlled jointly by the relays for holding the double throw relay for a predetermined time in one of its positions when the single throw relay is actuated.

7. In an electric system comprising a circuit interrupter having a trip coil, means for controlling the circuit of the trip coil comprising an overcurrent relay having relatively movable cooperating contacts and a double throw directional relay having two sets of relatively movable cooperating contacts, the overcurrent relay contacts and one set of the directional relay contacts being connected in series in the trip coil circuit, and means arranged upon the closing of the overcurrent relay contacts when the directional relay has operated to close its other set of contacts to prevent the closing of the first set of directional relay contacts for a predetermined time comprising a normally deenergized substantially instantaneous pick-up time delay drop-out relay having a winding connected to be energized when the overcurrent relay contacts and the other set of directional relay contacts are closed whereby to prevent the completion of the trip coil circuit for a predetermined time.

8. An electric circuit and protective means therefor comprising a circuit interrupter having a trip coil and electroresponsive means for controlling the circuit of the trip coil comprising an overcurrent relay having relatively movable cooperating contacts and a double throw power directional relay having two sets of relatively movable cooperating contacts, said relays being connected to be energized from the circuit, and the overcurrent relay contacts and one set of the power directional relay contacts being connected in series in the trip coil circuit whereby to effect the opening of the circuit interrupter on the occurrence of power flow in one direction and current above a predetermined value, and means for holding the other set of power directional relay contacts closed for a predetermined time on the occurrence of power flow in the opposite direction and current above the predetermined value comprising a normally deenergized substantially instantaneous pick-up and time delay drop-out relay having a winding connected to be energized when the overcurrent relay contacts and the other set of power directional relay contacts are closed whereby to prevent the opening of the circuit interrupter for a predetermined time.

In witness whereof, I have hereunto set my hand this 3d day of May, 1926.

OLIVER C. TRAVER.